INVENTOR.
Stanley Ronald Barnette

INVENTOR
STANLEY RONALD BARNETTE

*INVENTOR*
STANLEY RONALD BARNETTE

United States Patent Office 3,379,603
Patented Apr. 23, 1968

3,379,603
CAST PLASTIC LAMINATES AND CAST PLASTIC
ARTICLES OF MANUFACTURE
Stanley Ronald Barnette, 90 Cherokee St.,
Miami Springs, Fla. 33166
Original application Apr. 24, 1959, Ser. No. 808,599, now
Patent No. 3,072,973, dated Apr. 15, 1963. Divided and
this application Jan. 14, 1963, Ser. No. 251,420
11 Claims. (Cl. 161—5)

This application is a division of my copending application, Ser. No. 808,599, filed Apr. 24, 1959, now Patent Number 3,072,973.

The invention relates to a method of forming articles of laminated plastic by a casting process which includes having the articles in any desired shape or form and with plain or decorative surfaces and/or plain or decorative embedments.

The invention contemplates the method of enveloping a core stock whereby to attain a product having bulk without excess weight and with full strength characteristics.

The invention also relates to an article of manufacture in the form of a cast plastic laminate.

An object of the invention is to provide a means of forming cast laminated sheeting and surfacing material wherein the laminations are cast in layers, with or without a decorative material. Another object of the invention includes completely surrounding a core stock by means of an enveloping plastic material that hardens by a curing process.

The invention also relates to a method of cast laminating pearlized, plain, or patterned decorative sheeting and enveloping a core stock material so as to achieve a structural surfacing material and particularly to such methods utilizing plastic.

Another object of the invention is to provide a method wherein the cast laminated material is provided with an extremely smooth or embossed effect, relatively hard surface.

A further object of the invention is to provide a method wherein the core material is completely surrounded by plastic and adds materially to the strength of the finished itemed product.

Other objects and advantages will become apparent in the following specification when considered in the light of the attached drawings, in which.

Figure 6:
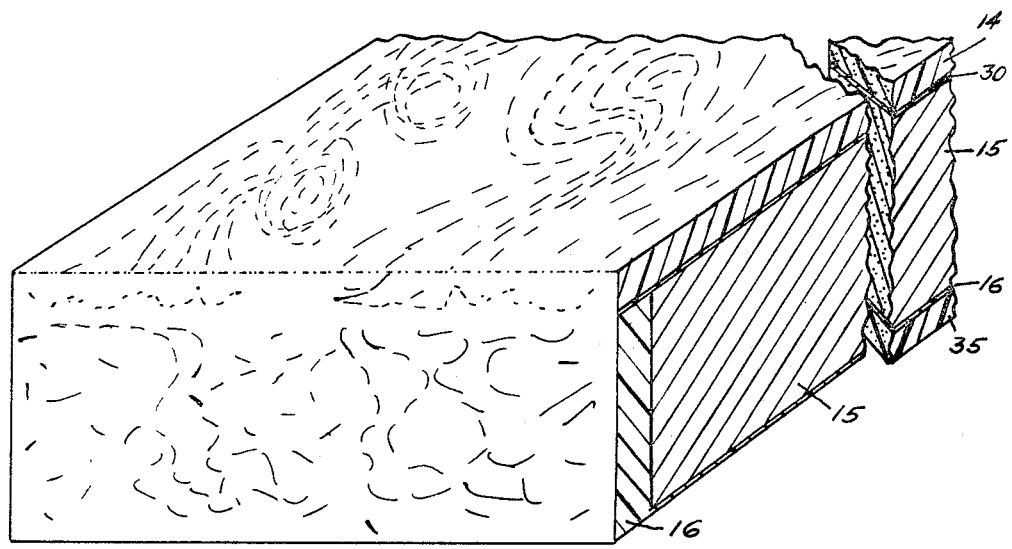

FIGURE 6 is a sectional view of a cast-laminated product having decorative media in a plastic surface layer. The right hand portion shows top and bottom finished plastic as-cast surface layers. These figures, as well as FIGURES 8–10 show embodiments as particularly described in the cited examples and namely four of many, and given hereinbelow.

Figure 7:
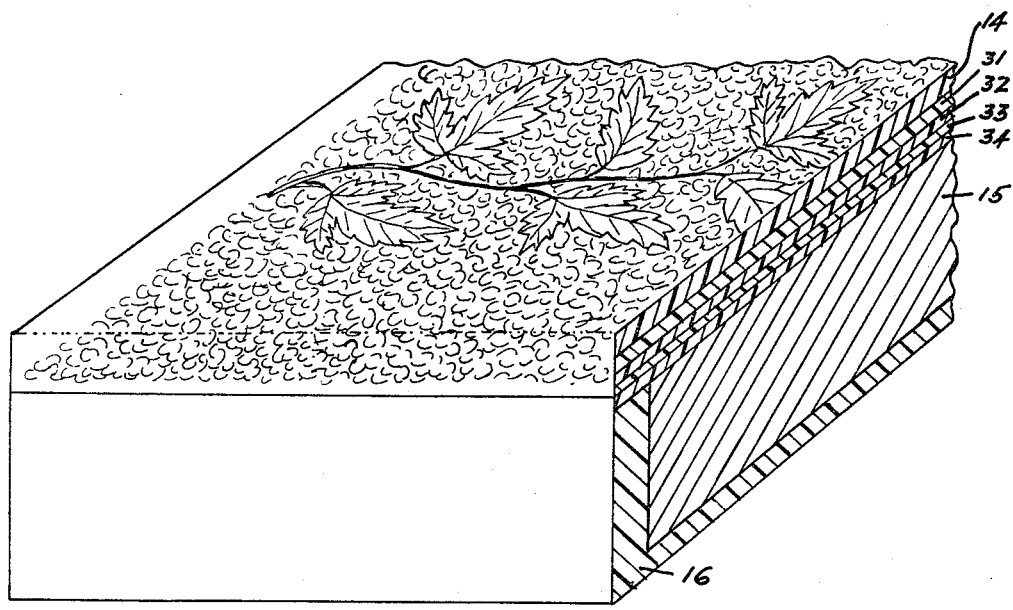

FIGURE 7 shows the example, in a sectional view, a portion of an embodiment of the deep dimensional invention having a build up of clear layers, embedments, a pearlescent layer, and the white masking layer, all integrally bonded together and to a core.

Figure 8:
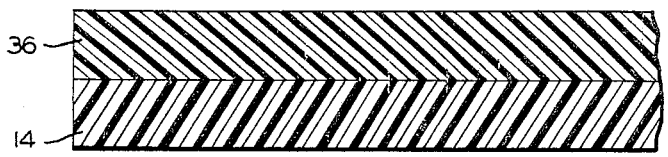

The embodiment illustrated in FIGURE 8 comprises a sectional view of the cast-laminated sheeting article having a layer of relatively hard plastic, as well as a layer of flexible formulated plastic integrally bonded to one another.

Figure 9:
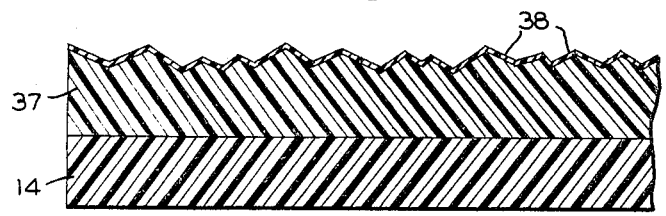
Figure 10:
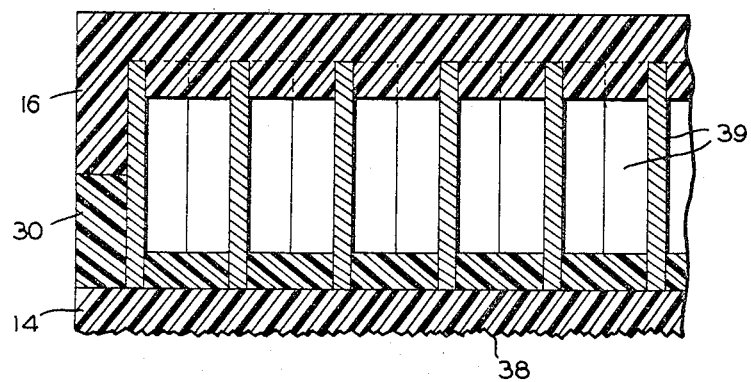

FIGURES 9 and 10 are partial sectional views of sheet articles.

Figure 1:
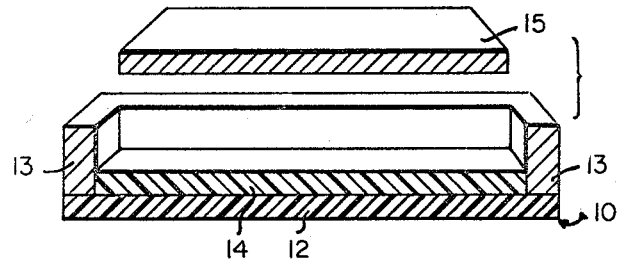
FIGURE 1 is a perspective view shown partially in section of one step of the process.

In practicing the method of the instant invention, a mould base, such as that illustrated at 10 in FIGURE 1, having a bottom 12 and upstanding sides 13 are coated with a release comprising a mixture of 25 parts lecithin and 75 parts of mineral spirits.

In the event an embossed effect is desired, a preformed embossed sheeting of polyester film can be used and no coating is necessary as this material in itself acts as a ready release.

Any thermosetting or thermoplastic resinous material or matter which hardens with curing, such as epoxy, polyester, styrene, methylmethacrylate, or any others can be used in formulating the cast laminated sheeting and enveloping processes, and the resulting products. However, for descriptive purposes in respect to the methods used, the polyester thermosetting variety formulation is used in this description. If thermoplastics are used, the described method will vary in that instead of the air cure, direct heat will be employed.

It should be noted that the mould base, as shown in FIGURE 1, is a glass or melamine type and after same has been coated, and carefully wiped clean, the polyester variety of thermo-setting resin plastic is poured into the mould to a registered depth, as is outlined on the wall illustrated at 13 in FIGURE 1. In one example of cast lamination made under this method, the required amount of plastic is dependent upon the thickness and/or decorative medium to be covered and will vary considerably. However, to describe a relatively simple patterned sheet and enveloping process, a 48" round mould is readied and coated with the release. Six quarts of the selected resin, 3 ozs. of pearlescence, 3½ ozs. of "MEK-peroxide," ¼ oz. of cobalt naphthenate, and ½ quart of purified styrene is the total necessary for the chemical mixture. The resin, pearlescence, cobalt, and purified styrene are mixed in one container and 2½ quarts of resin is poured into a separate container to which 2 ozs. of the "MEK-peroxide" is stirred. The latter is then poured into the mould and to achieve a highly pearlescent effect, same is mottled by hand by means of combing the liquid in swirled effects, thereby providing decorative media asymmetrically distributed in depth within the mottled layer. In about 5 minutes, which will fluctuate dependent upon the room temperature being used, the mass will thicken and commence to "jell." At this point 1 quart of the resin is mixed with ¾ oz. of the "MEK-peroxide" and poured into the mould as a secondary cast lamination. The plastic in the mould is then permitted to level itself and a core stock 15, whether of a solid material such as wood, plywood, cast plastic, particle board or a material having open space therein such as, honeycomb, foamed plastic or any other filler, is placed into the mould. This core was ¾" thick to achieve, in this instance, a 1" stock, and had been previously turned down ¼" narrower than the mould rim. It is to be noted that in this one illustrated example the thickness of the plastic at the edge is about ¼ inch and is approximately ⅛ inch thick on the face of the core, and further that the volume occupied by the core is substantially greater than the volume occupied by the resin. Also, the volume of resin in relation to the volume occupied by the core is substantial. There will be a thin coating of plastic remaining on the back side of the core from that amount which was leveled into the edge. Also, the first cast and cured layer, since the core is narrower than the mold as defined by the upright mold walls, and the second cast layer into which the core is placed extend beyond the core to a point flush with the surface of the layer of plastic covering the edge of the core. Within one hour, or somewhat less, the remainder of the resin, which is 2½ quarts, is stirred with the remaining ¾ oz. of "MEK-peroxide" and poured on top of the core material. A level rule is used to push the fluid into the rim cavity.

Approximately 3 hours maximum time is required for the plastic to set so as to be able to remove it from the mould.

Figure 2:
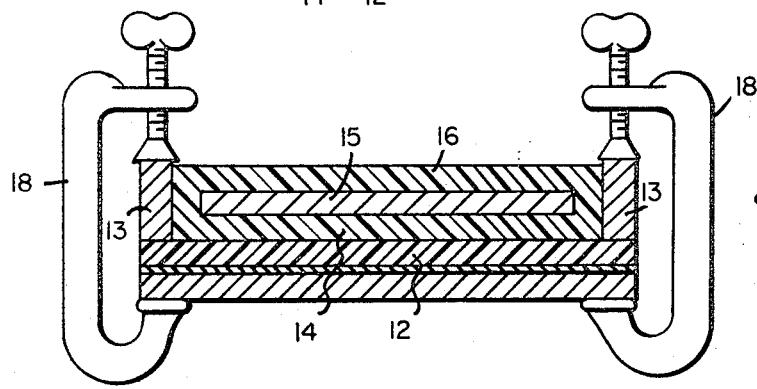
FIGURE 2 is a sectional view similar to FIGURE 1, illustrating another step of the process.
Figure 3:
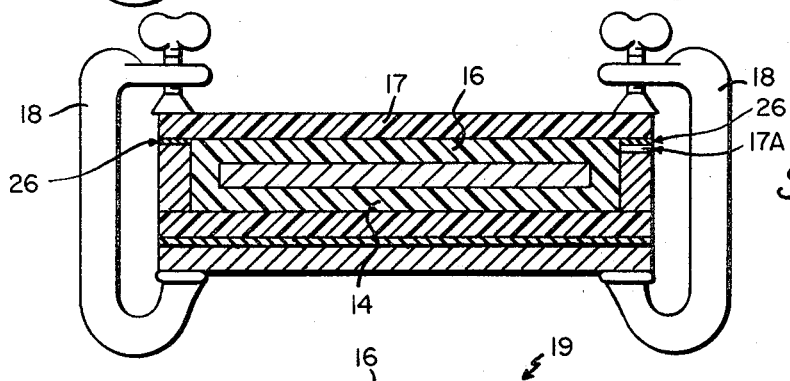
FIGURE 3 is a sectional view similar to FIGURE 2, which has the top of the mold in place illustrating a step in the process to produce smooth sides at the top and on the bottom.

The above description closely describes that sectional view as appears in FIGURE 2 and it should be noted that the lower face of the casting 14 will have an extremely smooth as cast crystal clear surface, namely the side immediately on the face of the mould. Should two extremely smooth in appearance sides on the casting 16 be desired, it will be noted that in FIGURE 3, a top face mould 17 has been added. This procedure in the latter event is as follows:

The layer of plastic 16 in FIGURE 2 must remain in the "tacky" stage, not too thin so as to run, but yet not so hard as not to permit adhesion to the additional lamination. The clamps 18 in FIGURE 2 are removed and a gasket 26 is placed in a stripping immediately over walls 13 in FIGURE 2 to prevent the liquids from leaking when the mould is filled. A tempered plate glass 17, or other face moulding as required, is then placed on the gasket 26 and the clamps 18 are reset to hold, as indicated in FIGURE 3. The entire mould is then tilted to a 45° angle to enable a filler resin to be poured into a slot 17A which has previously been machined in the mould in preparation for pouring the liquid into the mould. Some may prefer to pour into the slot by turning the mould upside down so as to guarantee the liquids will remain on the face until cured. However, it can be achieved in either method and which ever is more handy in the operation. When the entire mould cavity has been filled and any remaining air bubbles have been allowed to escape, the mould can be restored to the horizontal position and stored for cure. To produce a flat sheet without a core and to have flexibility in the sheet, omit the core and substitute a mixture of flexible polyester resins.

As disclosed herein, and as explained in the illustrative examples, the casting is conducted at atmospheric pressure in an open mold or a mold having an opening therein, and as a result the pressure within the blastic body of the cast-laminated plastic sheeting article and the pressure within the plastic cast-laminated to the bulk core is at substantially atmospheric pressure. The articles of the invention which have been cast-laminated by casting and curing successive layers of plastic have these layers present in a structure in which the layers are integrally bonded to one another and to the core, where it is present, the layers and core being firmly welded to one another and polymerization-bonded to one another by reason of the layers being cured while in direct intimate contact with one another. As to the decorative sheeting article a plurality of layers of cured plastic are present and in this one example at least one of said layers contains distributed in depth therein a deeply three-dimensional mottled effect which may be seen through a finished surface of the plastic body of said sheeting over at least a substantial expanse of the surface, and the outer layers of the plastic body preferably are of substantially equal thickness. Preferably for both the substantially or completely enveloped core article and the sheeting article a substantially as-cast finished surface layer is provided which may be wholly transparent, this being of course a transparent layer which is cast in contact with the mold surface.

The sheeting article may also include as a suitable structure a plastic core having plastic bodies on each face thereof, each of the layers being integrally bonded to adjacent layers by means of having cured one layer while in contact with a previous layer which is at least partially cured. At least one of the plastic layers has decorative media such as pigment within the layer and distributed in depth therethrough, and the plastic layers on each face of the plastic core are of substantially equal thickness thereby giving a balanced and warp resistant article. It should be noted that a wholly transparent sheet can be made by simply casting a transparent synthetic resin on the mold face and as stated, when solidified, applying the top mold cover, reversing the mold assembly and introducing into the cavity a like amount of a transparent synthetic resin still at atmospheric pressure, whereby a wholly transparent and counter-balanced article is formed.

The above described cast lamination will be of a natural pearl color which is a greyish white tone. Various tinted pigments can be added for the desired effects in color wanted.

Another example will be given which more clearly indicates the dimensional effects that may be achieved in this cast lamination process. It should be noted that this formulation is used as an example dependent upon the effect of dimension desired and, also, the thickness of the embodiments themselves and the amount of liquids necessary to completely cover. However, still using a 48" round mould, the required materials would include a total of 384 ozs. thermosetting resin, 7 ozs. purified styrene, 3⅔ ozs. "MEK-peroxide," ½ oz. cobalt napthenate, 2½ ozs. pearlessence, and 1 oz. pigmented white polyester paste, and 10 drops of blue pigmented polyester color and paste tint. Of the above, 5½ qts. of the resin (176 ozs.) is mixed with ¼ oz. of the cobalt and 10 drops of the tinted blue paste. This amount is placed in readiness so as not to lose control in between the cast laminations that the various layers must be placed at the proper "jell" time to assure adherence of the layers. Of the total quantity stated, 2 quarts (64 ozs.) of the plastic is mixed with 7 ozs. styrene and 1 oz. of "MEK-peroxide" which is poured into the mould and leveled to the edges by hand operation. In approximately 15 minutes, the mass will begin to "jell," at which time 2 quarts (64 ozs.) from the stated total of resin is mixed with ½ oz. "MEK-peroxide" and testing to see that the mass is still jelled yet not hard, this mix is poured into the mould and leveled to the edges. At this time various decorative media for example discrete decorative pieces, elements or particles, such as dried leaves, mother of pearl flakes, metallic thread and the like, are placed in a formed pattern therein. These patterns can almost be exact in that there will be no movement of the placed items. Placing the items requires approximately 10 minutes for a 48" size layout, at the end of which time a quart of the total amount of the clear resin is added mixed with a ⅓ oz. of the "MEK-peroxide." There is remaining 16 ozs. of the clear resin from the original total amount to which ½ oz. of pearlessence is added, awaiting the last layer to "jell."

In about 20 minutes the base coat should be sufficiently jelled to permit the addition of the said 16 ozs. of clear resin mixed with pearlessence and to which ½ oz. of "MEK-peroxide" is added, kept agitated so as not to settle, stirred and brushed on the clear base in the mould. While this brush coat is setting, 6½ quarts (208 ozs.) of the total resin is mixed with 2 ozs. of pearlessence and ¼ oz. cobalt naphthenate in readiness. At this stage, and approximately 5 minutes after completing the pouring of the last addition, 2 quarts of the resin (64 ozs.) is mixed with 1 oz. of pigmented white and ⅓ oz. of "MEK-peroxide." It is stirred well and upon testing tackiness of the "jell," this amount is poured into the mould and level to the edges of the mould. In approximately 10 minutes, the white pigmented resin should have jelled to the proper consistency, still in the tacky stage, so that the core filler will be added. At any time within an hour, the remaining 4½ quarts mixed with 1 oz. of the "MEK-peroxide" is poured on the core and smoothed to the edges of the mould and into the cavity. This last 4½ quarts resin can either be tinted, pearlized or embedments added directly to the resin so that when solidified it will have a designed wall and back surface. Stated another way, decorative media will be visible in the plastic on both the top and the bottom faces of the core. In approximately 3 hours time, the plastic is set so as to be able to be removed from the mould. As is the case of the previous description, this casting will have only one extremely smooth surface, unless the procedure of FIGURE 3 is followed.

I have discovered that the addition of the tinted blue paste makes the casting come out clear, whereas otherwise it would be amber or pinkish.

In FIGURE 1 of the drawings, the plastic first poured into the mould 10 is indicated at 14 with the core 15 about to be placed in the mould 10. In FIGURE 2, the plastic 14 is shown supporting the core 15 and additional plastic 16 is engaged thereover. The mould wall is secured to the base by clamps 18.

In FIGURE 3 the plastic 14 is shown supporting the core 15 and additional plastic 16 is engaged thereover with an upper mould plate 17 secured thereagainst by clamps 18.

Figure 4:
FIGURE 4 is a perspective view of the product, partially in section, after it has been cast laminated.

FIGURE 4 shows a finished product, at 19 showing the core 15 completely surrounded by solidified plastic 20.

The mould 10 and the upper mould plate 17 can be made of glass or plastic to obtain a highly polished surface on that face of moulded article 19.

Figure 5:
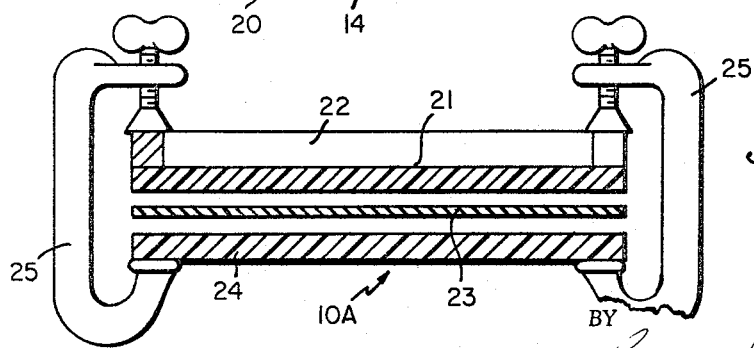
FIGURE 5 is a sectional view of a modified mould structure.

In FIGURE 5, a modified form of the mould 10 is illustrated at 10A and comprises a relatively flat mould base 21 having a retaining wall 22 fixedly secured thereto. A metal foil blanket 23 is positioned beneath the mould base 21 and a leveled platform 24 is secured to the mould base 21 by clamps 25 with the heat-retaining metal foil blanket 23 "sandwiched" therebetween.

The sectional view of a finished product made in accordance with the examples above is illustrated in FIGURE 6. As described in the example, this article includes one decorative media in the form of mottling in a surface, or upper layer 14, integrally bonded to a plastic layer 30. The latter layer is in turn integrally bonded to the core 15, which is at least partially surrounded by and integrally bonded to a layer 16. The surface layer 14 has a substantially as-cast finish. As in FIGS. 2–4 the plastic layer 16 on the back and edge surfaces is integrally bonded to the plastic on the top of the core in the complete envelopment example. The FIGURE 6 example has merely a coating on the back of the board of that plastic which remained on the said core after leveling same into the core edge. In the right hand portion of this figure a similar product is shown with a substantially as-cast surface layer 35 formed in the mold with the top cover in place, on the back of the article, as described in the examples given above.

FIGURE 7 is an illustration of the product described in the foregoing examples. This product as made shows a deep dimension and has a clear or transparent surface layer 14, having a substantially as-cast surface finish and being of clear or transparent plastic, bonded to a clear or transparent layer 31 containing embedded discrete decorative elements, next to a clear or transparent layer 32, in turn next to a pearlessence layer 33 which is adjacent to a white masking layer 34. Layer 34 is bonded to a core 15. A plastic layer 16 substantially surrounds the back and edge of said core. Each of the plurality of layers 14, 31, 32, 33, 34 and 16 is integrally bonded or welded to the adjacent layers or core. The plastic layer 16 on the back and edges of the core may be tinted, colored, pearlized, clear or contain embedments. A further modification has two finished, substantially as-cast faces similar to the product shown in FIGURE 7.

In FIGURE 8, a relatively hard plastic layer 14 of substantial thickness and having a substantially as-cast surface finish is integrally bonded to a layer 36 of relatively flexible plastic, substantially equal in thickness to said layer 14, to form the sheeting article. The FIGURE 8 article can have the first layer poured and when set, reverse the mold and pour a secondary layer into the cavity forming a counter-balanced sheet.

FIGURE 9 shows a transparent counter-balanced embossed type of article having an embossed layer 37 and a balancing layer 14, as made for example with an embossed film 38 as described above.

FIGURE 10 shows a finished article with a honeycomb core 39 and as described in the last part of this specification has an equal thickness of plastic.

It should be understood that following the method and principles of the invention above disclosed that table tops, decorative panels, wall panels, as well as structural surfacing material of various kinds, may be formed.

It will be noted from the foregoing description that I have provided as an article of manufacture, a cast plastic sheet suitable for many uses, such as, for example, but not limited to table tops, and that said sheet has considerable bulk or as much bulk as may be desired, without any greater weight than that of the plastic, the bulk being provided to the extent desired by an insert or core which is so embedded and in effect welded to the plastic material which surrounds it as to be integral. The cores can be of a wide variety and as light or as heavy as desired. The method or process of production is such that the sheet produced, whether with or without a core or filler, can be wholly or partially transparent and of any desired variety or mixtures of colors. As may be seen from the foregoing description and appended claims, where the substantially rigid structural core is omitted the product is termed a "sheeting article". By suitable embedments either per se or in addition to the core or filler, any number of beautiful designs and decorative motifs can be had. The method involves what I call cast laminating in that I produce the completed articles by a series of pours in such manner that each layer becomes integral with a preceding layer, instead of merely a series of independent sheets or common laminations merely each individually bonded to the other. Furthermore, if a specific embedment in an exact position is desired to be seen through the plastic, such embedment can be placed with exactitude as the layer of plastic on which it is placed is at that time in a sticky or tacky state, that is, it has not completelly jelled and hardened. The several plastic materials mentioned are of either the thermosetting or of the thermoplastic type as may be desired, and those listed are by way of illustration. The thermosetting type has been given in the examples of compounds and methods of procedure as they are generally preferable for certain purposes. However, the thermoplastics can be employed, with the difference that instead of self cure an application of heat will be necessary at the various stages, to effect the cure. In the use of the thermosetting plastics, my process can be speeded up, if desired, by the application of oven heat or heat from some suitable source, such as infra-red lamps or hot water.

The simple mould forms are of the melamine (Formica covered plywood) type as they can be very readily shaped to provide the desired side wall contours of the mould.

It is important to observe that in casting a laminated sheet comprising a lamination of, for example, wood or composition board and plastic, the insert must be covered on both sides by equal thicknesses of the outer plastic laminations to avoid warpage of the completed product.

I claim:

1. A substantially bulk rigid cast resinous plastic, structural core-reinforced panel comprising at least one inner substantialy rigid core and a cast resinous plastic body substantially enveloping and interlocking said core and being of substantially equal thickness on either side of said core wherein said core has a volume substantially greater than the resinous plastic body, said resinous plastic body comprising at least two layers of resinous plastic material, as least one of said layers comprising a masking means for said core, decorative media embedded in any one of said layers providing a deep-three-dimensional effect.

2. The panel of claim 1 wherein said article has a surface layer including a preformed adherable film.

3. The panel of claim 1 wherein said resinous plastic includes filler media.

4. The panel of claim 3 wherein said filler media further includes particles embedded in any one of said layers.

5. The panel of claim 1 wherein said decorative media comprises a composite of pre-formed elements.

6. The panel of claim 1 which includes the said core being foamed plastic.

7. The panel of claim 1 wherein the decorative media comprises a mottled design.

8. A sheeting article with two cast-laminated relatively hard finished surfaces comprising two opposite formed plastic bodies, said bodies consisting of unitary transparent plastic layers composed of cured polymerized resin, the first plastic body having been formed and cured in an open mold in an inward direction normal to the finished surface of said first plastic body forming the first finished surface of the article, the second plastic body consisting of one plastic layer having been formed in a closed mold in an exact opposite direction to the first plastic body and forming the secondary finished surface of the article, said bodies being back-to-back and providing balanced and warp-free characteristics, and wherein the outer plastic layers are equal in thickness.

9. The article of claim 8 having a pigmented coloring material in at least one of said layers.

10. The article of claim 8 in which decorative media is incorporated in a mottled design which extends through at least one of said layers in an asymmetrical three-dimensional effect.

11. The article of claim 8 in which at least one of said layers comprises an adherable embossed film.

References Cited

UNITED STATES PATENTS

| | | | |
|---|---|---|---|
| 2,347,320 | 4/1944 | Hiltner | 264—271 XR |
| 2,277,752 | 3/1942 | Frey | 161—6 XR |
| 2,817,619 | 12/1957 | Bickel et al. | 161—413 |
| 3,150,032 | 9/1964 | Rubenstein | 161—16.1 |
| 2,772,194 | 11/1956 | Fisher et al. | 161—161 XR |
| 2,845,318 | 7/1958 | Brewater et al. | 311—106 |
| 2,350,421 | 6/1944 | Shoder et al. | |
| 2,353,995 | 7/1944 | Conner | 161—5 |
| 2,451,913 | 10/1948 | Brice. | |

FOREIGN PATENTS

| | | |
|---|---|---|
| 280,017 | 11/1927 | Great Britain. |
| 651,252 | 4/1951 | Great Britain. |

OTHER REFERENCES

Embedding in Acrylica Modern Plastics, November 1953, vol. 31, No. 3, pp. 129–136.

Preserved in Plastics, Sc. Amer., p. 217, October 1939.

JACOB STEINBERG, *Primary Examiner.*

ALEXANDER WYMAN, *Examiner.*